United States Patent [19]
Ochsner

[11] Patent Number: 5,024,252
[45] Date of Patent: Jun. 18, 1991

[54] HOSES STABLE IN LENGTH UNDER THE EFFECT OF AN INTERNAL PRESSURE

[75] Inventor: Richard Ochsner, Rosny-Sous-Bois, France

[73] Assignee: Coflexip, Paris, France

[21] Appl. No.: 225,120

[22] Filed: Jul. 28, 1988

[30] Foreign Application Priority Data

Aug. 3, 1987 [FR] France ................... 87 10997

[51] Int. Cl.$^5$ .......................................... F16L 11/16
[52] U.S. Cl. ......................... 138/130; 138/137; 138/129
[58] Field of Search ............. 138/129, 130, 134, 137

[56] References Cited

U.S. PATENT DOCUMENTS

| | | | |
|---|---|---|---|
| 3,604,461 | 9/1971 | Matthews | 138/130 |
| 4,343,333 | 8/1982 | Keister | 138/130 |
| 4,402,346 | 9/1983 | Cheetham et al. | 138/129 |
| 4,403,631 | 9/1983 | Abdullaev et al. | 138/130 |
| 4,431,034 | 2/1984 | Abdullaev et al. | 138/130 |
| 4,522,235 | 6/1985 | Kluss et al. | 138/130 |
| 4,649,963 | 3/1987 | Raghaven et al. | 138/130 |

FOREIGN PATENT DOCUMENTS

| | | |
|---|---|---|
| 1650142 | 11/1947 | Fed. Rep. of Germany . |
| 2142764 | 6/1971 | France . |
| HU 8600051 | 4/1987 | Hungary ................ 138/130 |

Primary Examiner—Henry J. Recla
Assistant Examiner—Glenn T. Barrett
Attorney, Agent, or Firm—Hoffman, Wasson & Gitler

[57] ABSTRACT

A hose having stable length under pressure comprises an internal leak tightness sheath, and armoring consisting of at least two pairs of layers of helically wound wires, the two layers of the same pair being made of identical wires laid at the same sheathing angle but in the opposite direction, and an external protective sheath. All the wires are laid at one of two sheathing angles, one less than 55° the other greater than 55°; the wires of at least one pair of layers exhibit one sheathing angle between 40° and 53°, and the wires of at least one other pair of layers exhibit a second sheathing angle between 57° and 70°.

9 Claims, 1 Drawing Sheet

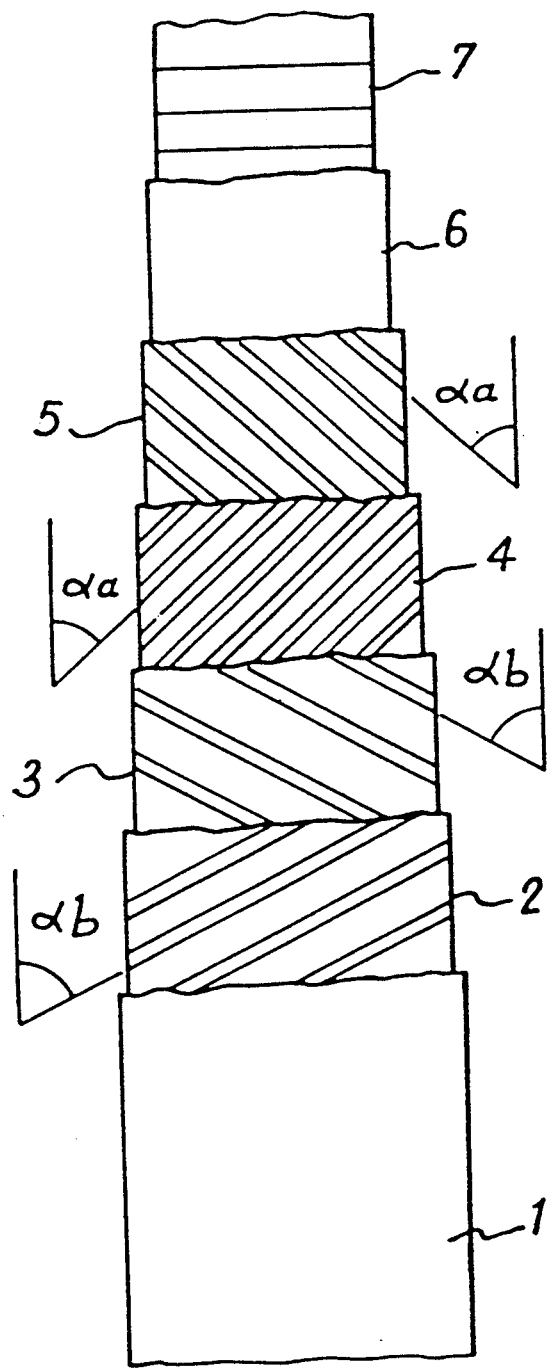

HOSES STABLE IN LENGTH UNDER THE EFFECT OF AN INTERNAL PRESSURE

BACKGROUND

This invention relates to hoses that are stable in length under the effect of an internal pressure.

This invention relates particularly to hoses for transporting fluids under pressure, such as in particular hydrocarbons produced during operation of underwater wells.

The applicant company produces and markets, in great lengths, such hoses which exhibit high mechanical properties, particularly tensile strength, resistance to crushing and to the internal pressure of the transported fluid.

Thus, the applicant company produces hoses essentially comprising an internal leak tightness sheath, an armoring with tensile strength usually made up of two crossed layers each consisting of wires placed spirally around the hose with the same sheathing angle, the wires of the two layers being wound with opposite angles relative to the axis of the hose, a pressure resistance armoring comprising one or more laYers of fastened strip or shapes wires wound by spiraling at an angle close to 90° relative to the axis of the hose, and an external sheath. They are the "smooth-bore" type hoses.

The "rough bore" type hoses further comprise, under the internal leak tightness sheath, an armoring with resistance to crushing and to external pressure generally consisting of a helical winding with a slight pitch of one or more fastenable shapes, particularly steel strip.

In some cases the pressure resistance armoring is eliminated and the wires of the two armoring layers are then placed at the equilibrium angle, namely 55°, relative to the axis of the hose.

In some applications, particularly in the case where the hoses, used for collecting hydrocarbons produced by underwater wells, must be buried, i.e., placed at the bottom of a trench made in the the underwater bottom, it is essential to avoid a notable axial elongation of the hose in operation under the effect of the internal pressure of the fluid transported, because such an axial elongation causes a deformation of the hose, running the risk of bringing it out of the trench.

Attempts have been made to propose hoses exhibiting as slight an elongation as possible in operation under high internal pressure.

Thus, French Patent 2 557 254 describes a hose comprising an armoring with tensile strength consisting of at least one pair of sheathing layers generally laid with a sheathing angle between 15° and 45° relative to the axis of the hose and a pressure resistance armoring comprising one or more layers of spiraled wires. This document provides for using determined ratios between the rigidities of the wires of the spiral layers of the pressure resistance armoring and the layers of wires constituting the armoring with tensile strength.

In the usual case where all the wires are of the same material, for example steel, this ratio is reduced to a ratio of thickness.

If the moduli of elasticity of the wires of the spiraled layers of the wires of the layers of the armoring with tensile strength are identical, a high thickness ratio is obtained (between 2.5 and 8) between the armoring with tensile strength and the pressure resistance armoring, which notably increases the linear weight of the hose, and therefore, its cost.

Further, it is not possible to benefit fully from the speed of the operation of the armoring machines which in practice is clearly greater than the speed of operation of a spiraling machine.

Moreover, it has been proposed in French Patent 2 464 423 to use an armoring consisting of a plurality of pairs of crossed layers of sheathing wires. However, this document does not give any constructive solution to assure dimensional stability particularly in the axial direction of the hose under the action of an internal pressure. Further, there is provided the presence of one or more pairs of layers wound at an angle of 90° relative to the axis of the hose, i.e., it is a case of spiraled wires with the drawbacks mentioned above.

The studies conducted by the applicant company show that when a hose is put under internal pressure two stages of axial deformation successively occur.

First, for a relatively slight rise in pressure, for example, up to 5 MPa, a relatively large axial deformation is noted, occurring inevitably from the existence of manufacturing plays between the layers of the armoring wires and from the fact of the deformation of the filling materials optionally placed between the armoring layers.

If particular constructive measures are not provided, a subsequent deformation phase then occurs which can be considerable when the internal pressure is high which is the case in practical applications where the operating pressures can reach values of several tens of MPa that is, in the range of 10-14 100 MPa.

SUMMARY OF THE INVENTION

This invention is proposed to achieve a hose which, by particular constructive measures, exhibits only a slight or zero deformation during the second phase of said deformation.

The measures recommended by this invention make is possible to achieve hoses which, when put under pressure, can exhibit a shortening during the second deformation phase, this shortening being able to be added to a shortening already obtained during the first deformation phase or compensating totally of partially for an elongation which would occur during the first deformation phase.

In other words, the invention makes it possible to achieve hoses whose dimensional variations, particularly in the axial direction, can be perfectlY controlled, to exhibit a certain elongation during application of a high internal pressure, if such an elongation is admissible, considering the conditions of use, a dimensional stability or also a controlle shortening.

This aim is achieved according to the invention by a hose comprising an internal leak tightness sheath, an armoring comprising at least two pairs of layers of helically wound wires, the two layers of the same pair being made up of identical wires laid at the same sheathing angle but in the opposite direction, and an external protective sheath, characterized in that all the wires are laid at one of two sheathing angles, one less than 55° ($\alpha_a$) the other greater than 55° ($\alpha_b$), the wires of at least one pair of layers exhibiting the same sheathing angle $\alpha_B$ such that:

40° $\leq \alpha_a \leq$ 53° and the wires of at least one pair of
layers exhibiting the same sheathing angle $\alpha b$ such
that:

$57° \leq \alpha_b \leq 70°$ said layers being arranged to satisfy the relation:

$$0.5 < \frac{Rp}{Rpo} < 2$$

where:

$$Rp = \frac{\sum_{i=1}^{i=n_a} \frac{(ka)i}{(l'a)i}}{\sum_{j=1}^{j=n_b} \frac{(kb)j}{(l'b)j}}$$

and $$Rpo = \frac{\frac{2\sin^2 \alpha_b \cos^2 \alpha_b}{Di} - \frac{\sin^4 \alpha_b}{Dmb}}{\frac{\sin^4 \alpha_a}{Dma} - \frac{2\sin^2 \alpha_a \cos^2 \alpha_a}{Di}}$$

where:
$n_a$ = number of pairs of layers sheathed at angle $\alpha_a$;
$n_b$ = number of pairs of layers sheathed at angle $\alpha_b$;
$(ka)_i$ and $(kb)_j$, respectively = the rigidity at axial elongation of the wires of each of the pairs of armoring layers i and j, respectively, sheathed at angles $\alpha_a$ and $\alpha_b$ respectively, k being defined by $k = T/\epsilon$, where T is the tension of the corresponding wire and $\epsilon$ is the relative elongation of the wire;
$(l'a)i$ and $(l'b)j$ respectively = average value of the width occupied by the wires, i.e., the width of the wire measured in the cross section of the wire and in the plane tangent to the cylinder produced by the armoring layer increased by the play between two successive wires, this width being determined by the formula $$l'k = \frac{\pi D_k \times \cos a_k}{N_k}$$

where $D_k$ is the average diameter of
  the layer of wires,
$\alpha_a$ is the sheathing angle, and
$N_k$ is the number of sheathing wires;
Di is the inside diameter of the first layer of interior sheathing wires;
Dma is the average diameter of $n_a$ pairs of sheathed layers at angle $\alpha_a$; and
Dmb is the average diameter of $n_b$ pairs of sheathed layers at angle $\alpha_b$.

For advantageous embodiments of the hoses according to the invention the ratio Rp/Rpo satisfies preferably the relation:

$$0.7 < \frac{Rp}{Rpo} < 1.7,$$

and more particularly the relation:

$$1 < \frac{Rp}{Rpo} < 1.7,$$

if it is desired to obtain in all cases a shortening of the hose under application of internal pressure.

In a particular embodiment of the invention two pairs of sheathing wires are provided, the value Rp then being defined by the following relation:

$$Rp = \frac{ka}{kb} \times \frac{l'b}{l'a}.$$

If instead of round wires, one employs substantially abutting wires having a rectangular or laterally flattened cross-section, and of a single linearly elastic material and with thicknesses of wires of the two internal layers and for the two external identical layers, respectively, the hose according to the invention is characterized by the following relation:

$$0.5 < \frac{Re}{Rpo} < 2,$$

where $$Re = \frac{\sum_{i=1}^{i=n_a} eai}{\sum_{j=1}^{j=n_b} ebj}$$

Re being the ratio of the thicknesses of the sheathing wires placed respectively at angles $\alpha_a$ and $\alpha_b$, eai and ebj being the thicknesses of the respective layers placed at angles $\alpha_a$ and $\alpha_b$.

Preferably the ratio Re/Rpo satisfies the relation:

$$0.7 < \frac{Rp}{Rpo} < 1.7,$$

and most perferably:

$$1 < \frac{Rp}{Rpo} < 1.7.$$

The layers of sheathing wires exhibiting the slighter sheathing angle ($\alpha a$) are advantageously placed on the inside relative to the layers of sheathing wires exhibiting the greater sheathing angle ($\alpha_b$) to obtain in all cases a shortening during the first deformation phase.

As armoring wires according to the invention, it is possible to use wires of steel or of composite materials, for example, consisting of mineral fibers such as glass or carbon, or organic fibers, such as aramid fibers buried in a matrix of thermoplastic resin, such as a polyamide resin, or thermosetting resin such as an epoxy resin.

According to the invention the armoring wires can consist of stands or cables made from steel wires.

The armoring wires can also consist of parallel fibers of plastic material, for example, of polyester surrounded by a braid or by a sheath.

Plastic or elastomer sheathes can be placed between the pairs of layers of wires of the layers of a pair.

It is possible according to the invention to make both smooth bore type and rough bore type structures.

BRIEF DESCRIPTION OF THE DRAWING

The accompanying drawing illustrates diagrammatically a hose according to the invention.

DESCRIPTION OF THE PREFERRED EMBODIMENT

A hose embodying the invention comprises an external protective sheath 1 of plastic or elastomer material, a pair of layers of sheathing wires 2, 3 laid at angle $\alpha_a$, a pair of layers of sheathing wires 4, 5 laid at angle $\alpha_b$ and an internal leak tightness sheath 6 of a plastic or elastomer material. In the example illustrated of a structure of the rough bore type, there is further provided an internal armoring 7, for example of fastened strip, assuring resistance to crushing and external pressure.

Embodiments will be described below of hoses according to the invention.

Five hoses were studied whose characteristics are given in the following table:

|        | Example 1 | Example 2 | Example 3 | Example 4 | Example 5 |
|--------|-----------|-----------|-----------|-----------|-----------|
| $\alpha_a$ | 40°     | 40°     | 43°     | 43°     | 50°     |
| $\alpha_b$ | 60°     | 60°     | 65°     | 65°     | 70°     |
| Di     | 230.2 mm  | 230.2 mm  | 174.4 mm  | 119.6 mm  | 230.2 mm  |
| Dma    | 234.2 mm  | 234.2 mm  | 180.4 mm  | 125.6 mm  | 238.2 mm  |
| Dmb    | 244.2 mm  | 244.2 mm  | 190.4 mm  | 136.6 mm  | 250.2 mm  |
| ea1    | 0.88 mm   | 2 mm      | 3 mm      | 3 mm      | 2 mm      |
| ea2    |           |           |           |           | 2 mm      |
| eb     |           | 3 mm      | 2.15 mm   | 2 mm      | 1.04 mm   |
| Re     | 0.293     | 0.93      | 1.5       | 1.5       | 3.846     |
| Rpo    | 0.490     | 0.490     | 1.125     | 1.02      | 3.358     |
| Re/Rpo | 0.6       | 1.9       | 1.33      | 1.47      | 1.15      |

The first four hoses exhibit a rough bore structure corresponding to that represented in the figure of the drawing.

The example of FIG. 5 also describes a rough bore structure comprising on the internal leak tightness sheath two pairs of layers of sheathing wires laid at the same angle $\alpha_a$.

In examples 1, 2 and 5 intermediate sheaths have been added between pairs of layers of sheathing wires.

The sheathing wires are high resistance steel wires (elastic limit on the order of 140 daN/mm2) flat and approximately abutting.

After putting under internal pressure and after the first deformation phase constituting essentially in taking up the manufacturing plays, there were obtained for each of the hoses studied the following relative length variations at an internal pressure of 40 MPa.

Hose 1: $+3.8 \times 10^{-3}$
Hose 2: $-3.7 \times 10^{-3}$
Hose 3: $-1.2 \times 10^{-3}$
Hose 4: $-1.8 \times 10^{13}$
Hose 5: $-1.3 \times 10^{-3}$ Although the invention has been described in connection with particular embodiments, it is quite evident that it is no way limited and that is possible to make numerous variations and modifications to it without thereby going outside its scope or spirit.

I claim:

1. A hose comprising:
   an internal leak tightness sheath,
   an external protective sheath, and
   an armoring between said sheaths,
   said armoring comprising at least two pairs of layers of helically wound wires, each of said pair of layers comprising first and second layers made up of identical wires laid at the same helix angle, but in opposite helical directions, wherein all the wires are laid at one of two helix angles, one less than 55° ($\alpha_a$) and the other greater than 550° ($\alpha_a$), the wires of at least one of said pairs of layers exhibiting the same helix angle $\alpha_a$ such that $$40° \leq \alpha_a \leq 53°$$

and the wires of at least one other pair of layers exhibiting the same helix angle $\alpha_a$ such that $$57° \leq \alpha_a 70° ",$$

said layers being arranged to satisfy the relation $$0.5 < \frac{Rp}{Rpo} < 2$$

where:

$$Rp = \frac{\sum_{i=1}^{i=n_a} \frac{(k_a)_i}{(\phi'a)_i}}{\sum_{j=1}^{j=n_b} \frac{(k_b)_j}{(\phi'b)_j}}$$

and $$Rpo = \frac{\dfrac{2\sin^2\alpha_b \cos^2\alpha_b - \sin^4\alpha_b}{Di} \quad \dfrac{}{Dmb}}{\dfrac{\sin^4\alpha_a - 2\sin^2\alpha_a \cos^2\alpha_a}{Dma} \quad \dfrac{}{Di}}$$

where:
$n_a$ is the number of pair of layers wound at angle $\alpha_a$,
$n_b$ is the number of pair of layers wound at angle $\alpha_b$,
$(k_a)$; and $(k_b)$, respectively are the rigidity at axial elongation of the wires of each of the pairs of armoring layers i and j, respectively, wound at angles $\alpha_a$ and $\alpha_b$, respectively,
k being defined by $k = T / \epsilon$, where T is the tension of the corresponding wire and $\epsilon$ is the relative elongation of the wire,
(l'a), and (;'b), respectively are the average value of the width occupied by the wires, i.e., the width of the wire measured in the cross section of the wire, and in a plane tangent to the cylinder produced by the armoring layer, increased by the play between two successive wires, this width being determined by the formula $$\phi'k = \frac{\pi D_k \cos \alpha_k}{N_k}$$

where
$D_k$ is the average diameter of the layer of wires,
$\alpha_k$ is the sheathing angle, and
$N_k$ is the number of sheathing wires;
Di is the inside diameter of the first layer of interior sheathing wires;
Dma is the average diameter of $n_a$ pairs of sheathed layers at angle $\alpha_a$; and
Dmb is the average diameter of $n_b$ pairs of sheathed layers at angle $\alpha_b$.

2. A hose according to claim 1, characterized by the following relation:

$$0.7 < \frac{Rp}{Rpo} < 1.7.$$

3. A hose according to claim 1, characterized by the following relation:

$$1.0 < \frac{Rp}{Rpo} < 1.7.$$

4. A hose according to claim 1, comprising two pairs of armoring layers.

5. A hose according to claim 1, wherein the layers of armoring wires exhibiting the smaller helix angle $\alpha_a$ are placed interiorly relative to the layers of armoring wires exhibiting the greater helix angle $\alpha_a$.

6. A hose according to claim 1, further comprising, under the leak tightness sheath, a crushing and external pressure resistant armoring layer comprising a helical winding with a slight pitch.

7. A hose according to claim 1, wherein said armoring layer comprises laterally abutting armoring wires of rectangular or flattened section of a single linearly elastic material characterized by the following relation:

$$0.5 < \frac{Re}{Rpo} < 2,$$

where $$Re = \frac{\sum\limits_{i=1}^{i=n_a} e_{ai}}{\sum\limits_{j=1}^{j=n_b} e_{bj}},$$

Re being the ratio of the thicknesses of the armoring wires placed respectively at angles $\alpha_a$ and $\alpha_b$, and $e_{ai}$ and $e_{bj}$ being the thicknesses of the respective layers placed at angles $\alpha_a$ and $\alpha_b$.

8. A hose according to claim 7, which satisfies the relation:

$$0.7 < \frac{Re}{Rpo} < 1.7.$$

9. A hose according to claim 7, which satisfies the relation:

$$1.0 < \frac{Re}{Rpo} < 1.7.$$

* * * * *

UNITED STATES PATENT AND TRADEMARK OFFICE
CERTIFICATE OF CORRECTION

PATENT NO. : 5,024,252
DATED : JUNE 18, 1991
INVENTOR(S) : RICHARD OCHSNER

It is certified that error appears in the above-identified patent and that said Letters Patent is hereby corrected as shown below:

Column 6, lines 25-29, the formula reading $$"Rpo = \frac{\frac{2\sin^2\alpha_b \cos^2\alpha_b - \sin^4\alpha_b}{Di \quad Dmb}}{\frac{\sin^4\alpha_a - 2\sin^2\alpha_a \cos^2\alpha_a}{Dma \quad Di}}"$$

should read $$-- Rpo = \frac{\frac{2\sin^2\alpha_b \cos^2\alpha_b}{Di} - \frac{\sin^4\alpha_b}{Dmb}}{\frac{\sin^4\alpha_a}{Dma} - \frac{2\sin^2\alpha_a \cos^2\alpha_a}{Di}} --$$

Signed and Sealed this

Twenty-fourth Day of November, 1992

Attest:

DOUGLAS B. COMER

*Attesting Officer*     *Acting Commissioner of Patents and Trademarks*